United States Patent [19]
Berg et al.

[11] 3,868,123
[45] Feb. 25, 1975

[54] FOOD SERVICE STORAGE VEHICLE

[75] Inventors: Donald P. Berg, Shaker Heights; Carl E. Bochmann, Brecksville, both of Ohio; Anthony J. Brescia, Winchester, Va.

[73] Assignee: Rubbermaid Commercial Products, Inc., Winchester, Va.

[22] Filed: Dec. 10, 1973

[21] Appl. No.: 423,263

[52] U.S. Cl............................. 280/79.2, 211/177
[51] Int. Cl................................................. B62b 5/00
[58] Field of Search................ 280/79.3, 79.2, 79.1; 211/177; 16/29

[56] References Cited
UNITED STATES PATENTS

| | | |
|---|---|---|
| 1,097,163 | 5/1914 | Brown............................ 280/79.3 |
| 1,691,621 | 11/1928 | Young............................ 280/79.3 |
| 2,385,559 | 9/1945 | Wenthe............................. 211/177 |
| 2,774,609 | 12/1956 | Winger........................... 280/79.1 |
| 3,610,429 | 10/1971 | Mackay........................... 280/79.3 |

*Primary Examiner*—Robert R. Song
*Attorney, Agent, or Firm*—Hamilton, Renner & Kenner

[57] ABSTRACT

A wheeled open-ended rectangular vehicle with a plastic base having corner casters locked therein to corner posts extending upwardly therefrom, multiple plastic side wall sections superposed one upon another slidably mounted on said posts and having interior ribs for slidably supporting food receptacles, and a plastic quick-detachable cover mounted atop said posts.

17 Claims, 21 Drawing Figures

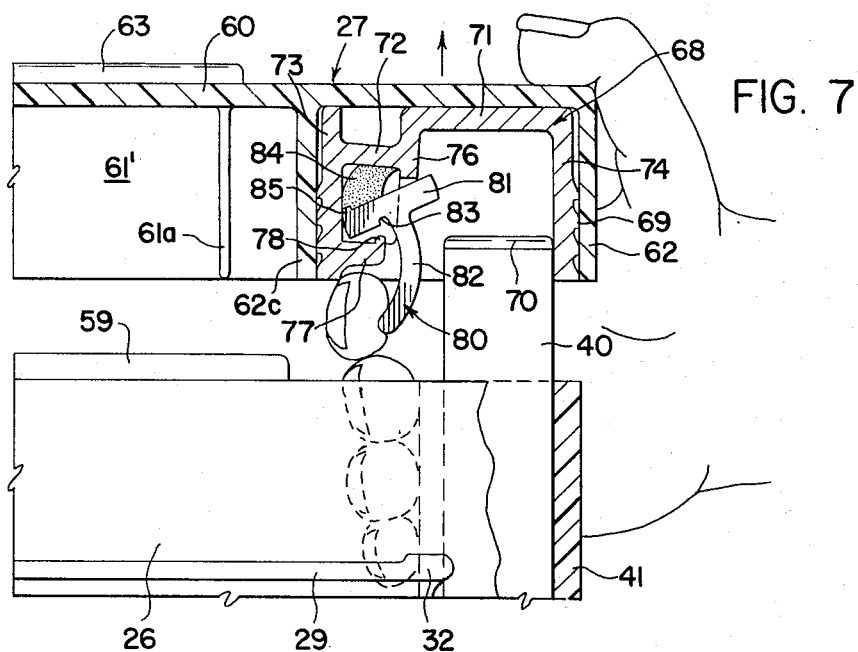
FIG. 7
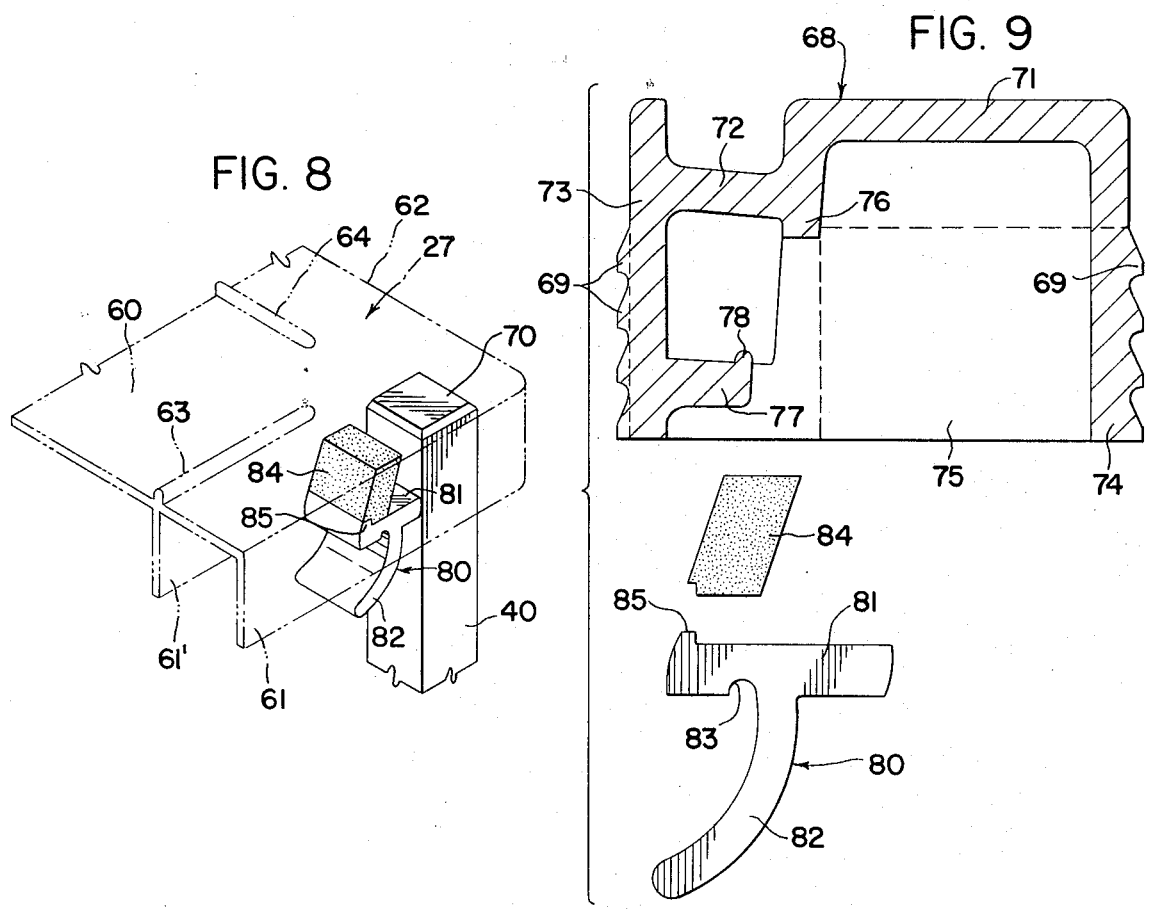
FIG. 8
FIG. 9

3,868,123

FOOD SERVICE STORAGE VEHICLE

BACKGROUND OF THE INVENTION

In the handling of foods in, to and from commercial and institutional kitchens, there has been a great amount of wasted labor and inefficiency due to the lack of available equipment for coordinated operations. Moreover, the use of conventional metal racks, carts and dollies has required constant maintenance and repair to keep such equipment clean and free of corrosion and contamination. Further, different sizes and designs of such equipment have been used for different operations, thus requiring a substantial investment in racks and carts of different heights and capacities, which do not lend themselves to coordinated and modular systems.

SUMMARY OF THE INVENTION

The novel construction of the food service and storage vehicle of the present invention meets modern requirements for coordinated operations in commercial and institutional systems. It also conserves labor and maintenance expense, and greatly improves sanitary conditions.

An object of the present invention is to provide an improved vehicle for use in a modular storage system utilizing food receptacles having standard dimensions common to the food service industry, while preventing accidental removal of the food receptacles from the vehicle.

Another object is to provide an improved food service storage vehicle having substantially all exposed parts of plastic material.

A further object is to provide an improved vehicle construction adapted to be assembled in various heights for various related operations.

Another object is to provide an improved vehicle construction having side wall sections with improved receptaclesupporting ribs stacked slidably upon four corner posts and a detachable flat top section rigidly connecting the posts.

A further object is to provide an improved hand trigger latch mechanism for locking the top section to the posts.

A still further object is to provide an improved vehicle having a plastic base supporting the four corner posts and novel insert mechanism in the base rigidly connecting the posts to supporting casters.

These and ancillary objects are accomplished by the parts, improvements, constructions and combinations comprising the present invention, a preferred embodiment of which is shown by way of example in the accompanying drawings and described in detail in the following specification. Various modifications and changes in details of construction are comprehended within the scope of the appended claims.

BRIEF DESCRIPTION OF THE DRAWINGS

FIG. 7 is a view similar to FIG. 5, showing hand operation of the trigger latch for releasing the top section.

FIG. 8 is a detached perspective view showing a latch engaging a corner post.

FIG. 9 is an exploded view showing a latch and the latch holding insert in section.

FIG. 13 is an exploded perspective view of a portion of a corner post, a corner of the base, the insert sleeve therein, and a caster.

FIG. 14 is an exploded perspective view of a portion of a corner post and the insert plug therefor.

DESCRIPTION OF A PREFERRED EMBODIMENT

Figure 1:
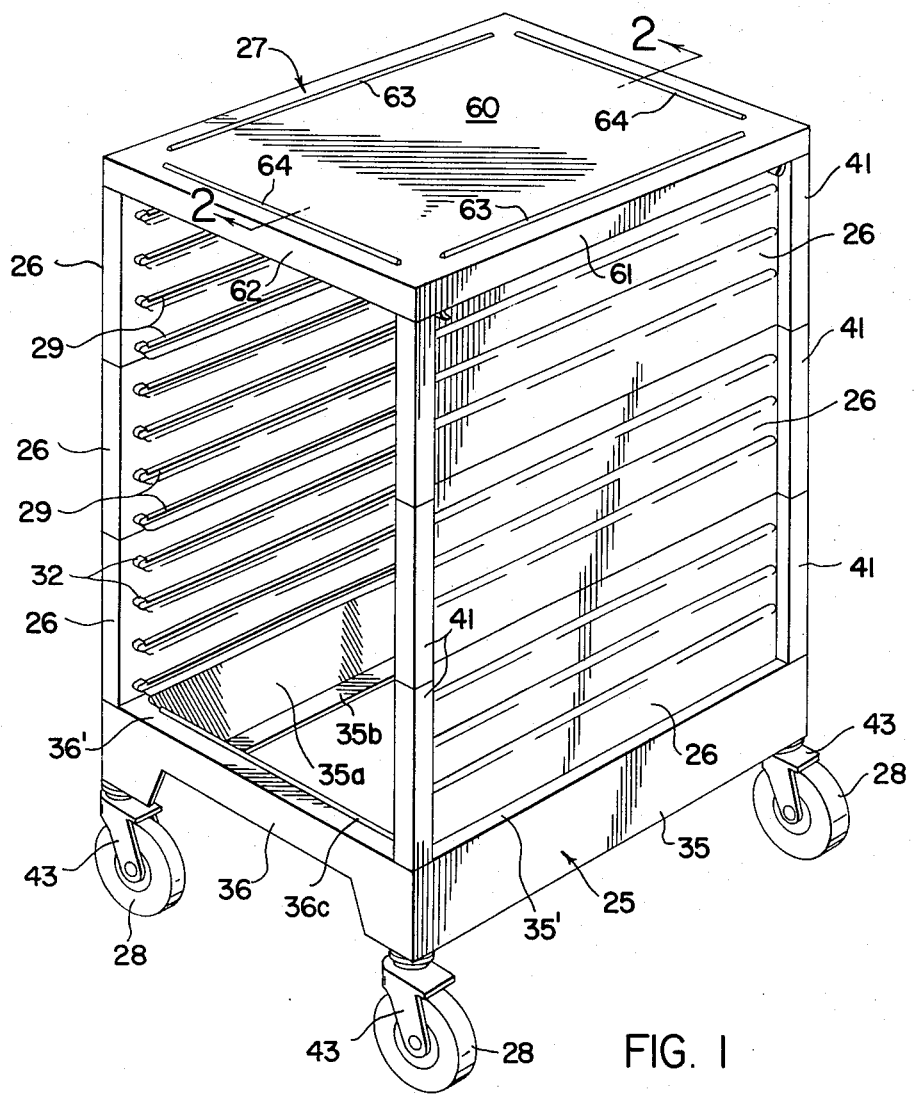
FIG. 1 is a perspective view of a preferred embodiment of a food service vehicle of the present invention.
Figure 2:
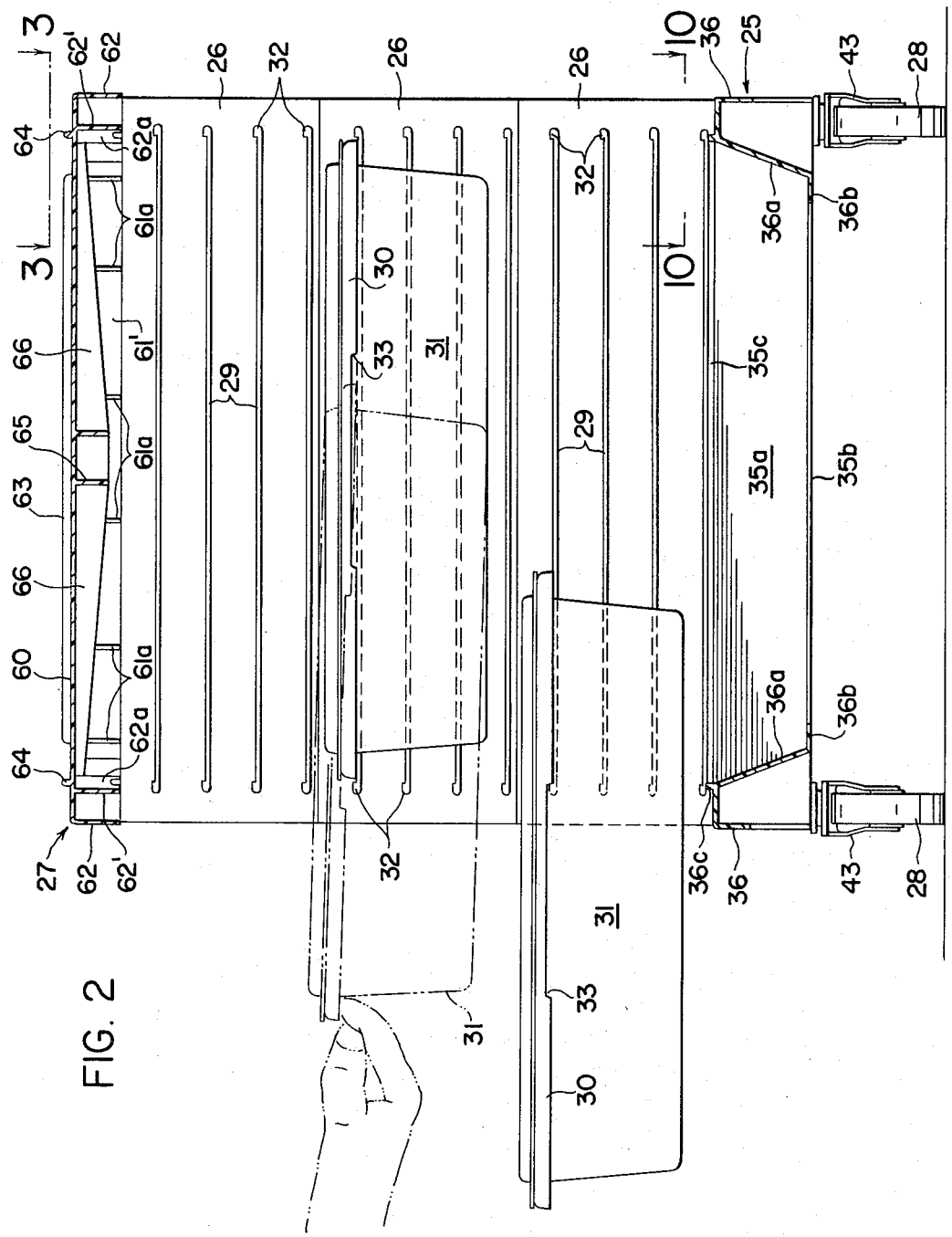
FIG. 2 is a vertical sectional view thereof showing receptacles supported therein in various positions.
Figure 3:
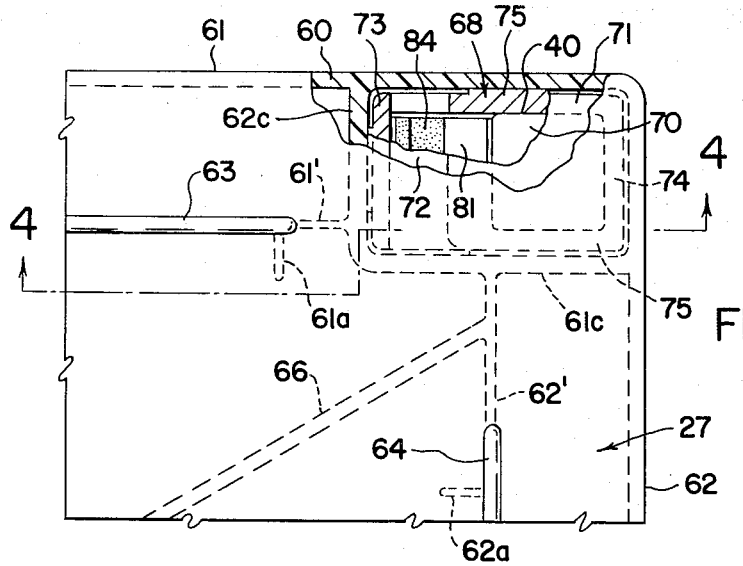
FIG. 3 is an enlarged top plan view, partly broken away and in section, of a corner of the top section.

A preferred embodiment of the improved food service vehicle is shown in FIGS. 1 and 2 as comprisng a one-piece base 25, stacked side wall sections 26 supported on the base, and a top section 27 resting on the uppermost side wall section. The base is rollably supported on casters 28, and the base, top and side wall sections form an open-ended vehicle or cart for storing and transporting food trays, lids or receptacles.

As shown in FIGS. 1 and 2, the side wall sections 26 are provided with vertically spaced horizontal slide or guide ribs 29 for slidably supporting side flanges 30 on food receptacles or trays such as indicated at 31. Such receptacles used in the food service industry have common or standard width and length dimensions, namely 18 inches × 26 inches, although receptacles of various depths are used. Accordingly, the side wall sections 26 and their ribs 29 are spaced apart laterally to support the side flanges of 18 inches × 26 inches receptacles. The side wall sections are molded of suitable plastic material, such as thermoplastic polycarbonate.

The ribs 29 are provided at their ends with upwardly projecting knobs or protuberances 32, best shown in FIGS. 18 – 21 and these are designed to cooperate with notches 33 in the intermediate portions of the side flanges 30 of the receptacles and act as safety stops preventing accidental removal of the receptacles as the vehicles are moved about. In FIG. 2, the lower receptacle is in a pulled-out position retained by the knobs 32 and the upper receptacle is shown in full lines wholly within the side walls and in the phantom position as being removed by lifting its outer end slightly to clear the knobs.

The one-piece rectangular base 25 is molded of suitable thermoplastic material, such as polycarbonate, and has side rail portions 35 and end rail portions 36. As best shown in FIGS. 11 – 14, the side and end rail portions have connected co-planar top flanges 35' and 36', respectively, and the top flanges 35' support the lowermost side wall sections 26. Preferably, interior inclined reinforcing flanges 35a and 36a extend downwardly from the inner edges of the top flanges 35' and 36' and these terminate at their lower edges in horizontal inturned flanges 35b and 36b. Bead portions 35c and 36c extend along the inner edges of top flanges 35' and 36'.

Figure 10:
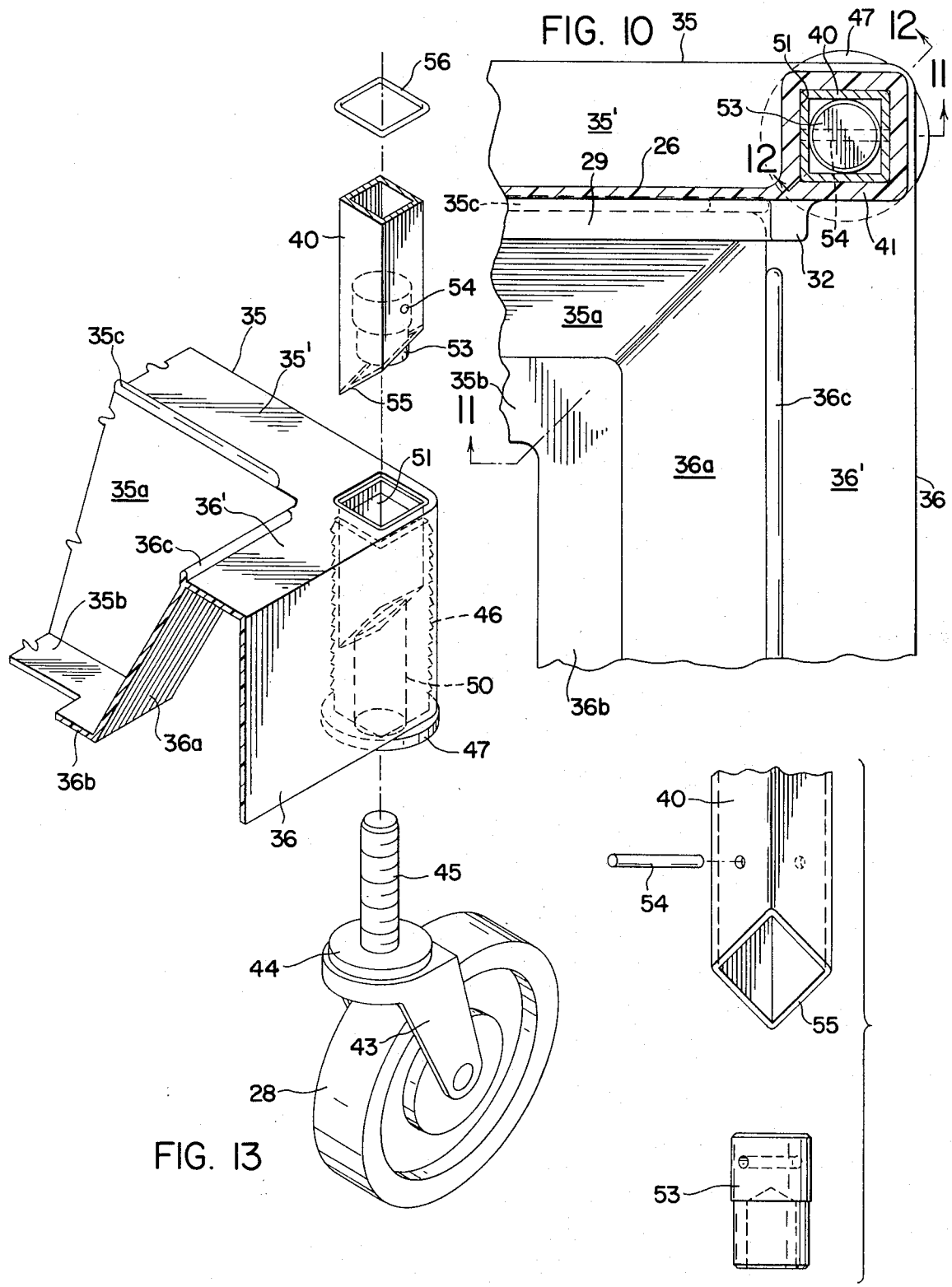
FIG. 10 is an enlarged horizontal section on line 10—10 of FIG. 2.
Figure 11:
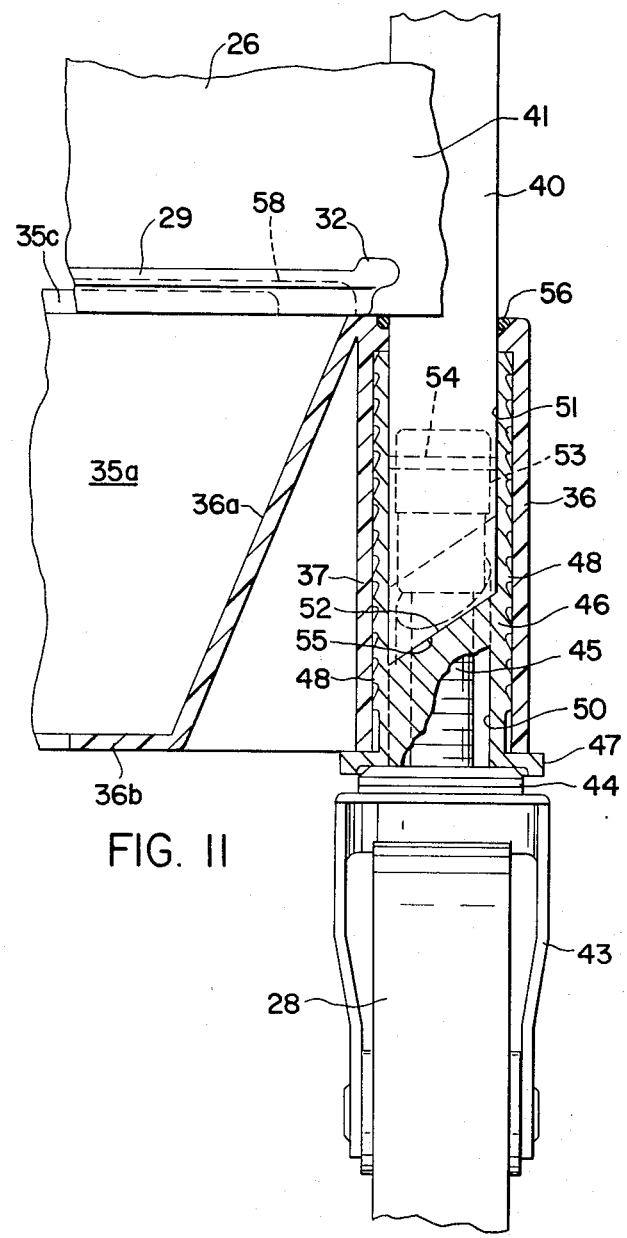
FIG. 11 is a sectional view on line 11—11 of FIG. 10 showing the improved insert mechanism for rigidly securing a caster to a corner post inserted in the base.

Within the corners between the side and end rails, vertically extending wall portions 37 and 38 at right angles to each other form, with the adjacent corner portions 35 and 36 of the side rails, corner tubes of square cross section. These tubes receive the bottom end portions of square tubular posts 40 extending upwardly from the base, as seen in FIG. 11, and the ends of the side wall sections 26 have square tubular portions 41 thereon which fit slidably over the posts, as seen in FIG. 10.

In the vehicle shown in FIGS. 1, 2 and 11 – 14, the posts 40 extend to sufficient height to accommodate three stacked side wall sections 26. Obviously, a larger number of stacked side wall sections can be accommodated by using corner posts of increased height. Further, by removing the side wall sections and the posts, the base 25 may be used as a dolly, in which case an inverted U-shaped handle having square tubular posts may be mounted in the corners of one end of the base. Thus, by providing two sets of corner posts of different height and a handle having posts of the same cross section the vehicle can be converted from a dolly to a food service cart or a movable rack of increased height.

The novel insert mechanism within the base 25 for rigidly connecting the corner posts 40 to the casters 28 which support the posts is best shown in FIGS. 10 – 18. Each caster wheel 28 is journaled in a bracket yoke 43 carrying an antifriction bearing 44 on its top plate, and a threaded metal stem 45 extends upwardly from the upper race of said bearing.

A tubular insert sleeve 46 of square cross section has a circular bottom flange 47 which is recessed to fit over the upper bearing race and the insert sleeve 46 fits into one of the square corner tubes formed by the wall portions 35, 36, 37 and 38 of the base. Preferably, the sleeve 46 is provided with a series of sharp transverse exterior peripheral ribs 48 to frictionally engage the inner surfaces of the plastic wall portions 35 – 38 so as to provide a tight fit, and the sleeve has an inner cylindrical bore 50 extending upwardly from its bottom spaced radially from the stem 45 when inserted therein.

Figure 12:
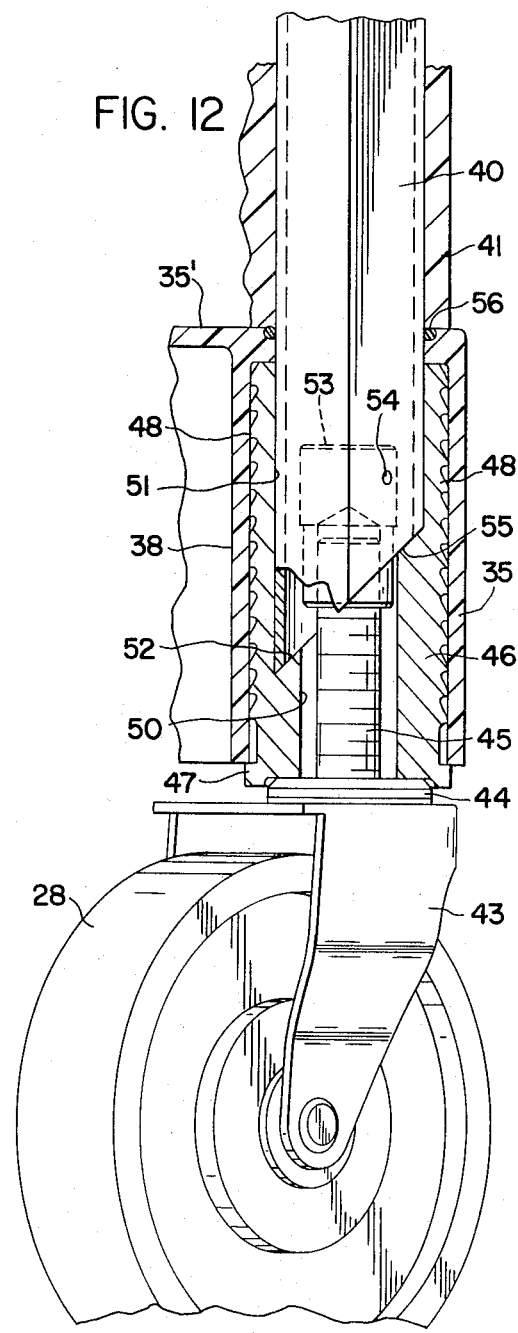
FIG. 12 is a sectional view on line 12—12 of FIG. 10.
Figures 15, 16:
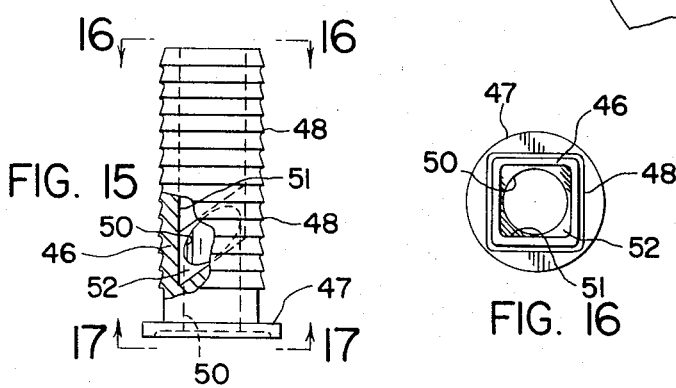
FIG. 15 is a detached side elevation, partly broken away, of the insert sleeve.
FIG. 16 is a top plan view thereof on line 16—16 of FIG. 15.
Figure 17:
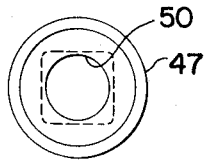
FIG. 17 is a bottom plan view thereof on line 17—17 FIG. 15.
Figure 18:
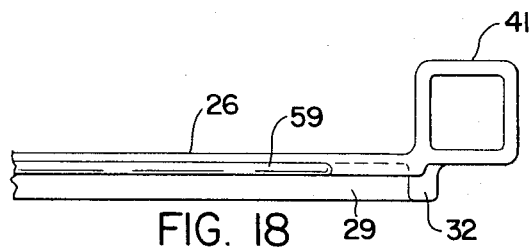
FIG. 18 is a partial top plan view of one of the side wall sections, taken on line 18—18 of FIG. 19.
Figure 19:
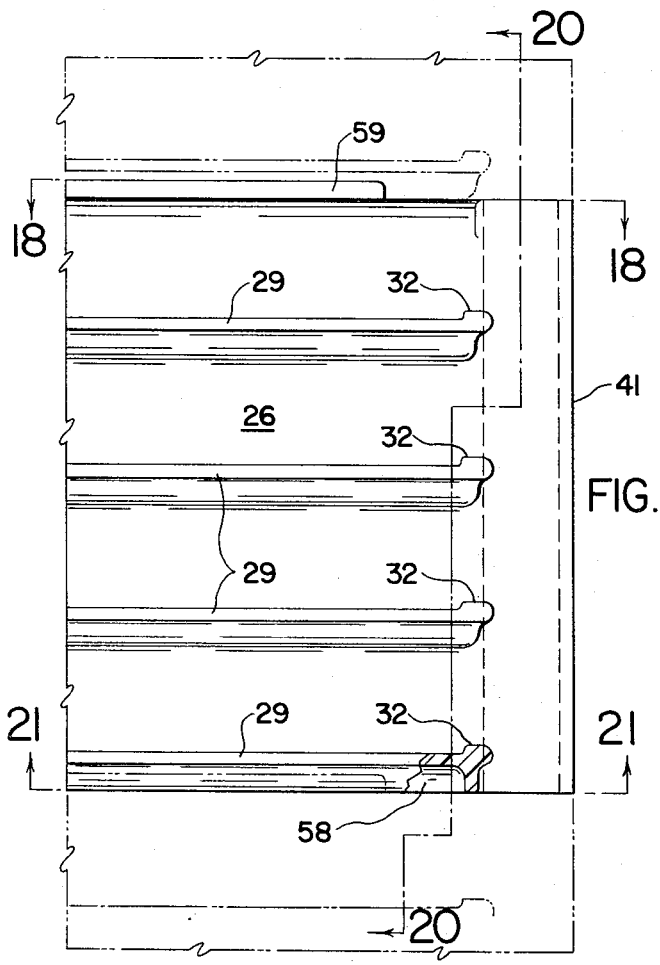
FIG. 19 is an interior side elevation of one of the side wall sections.
Figure 20:
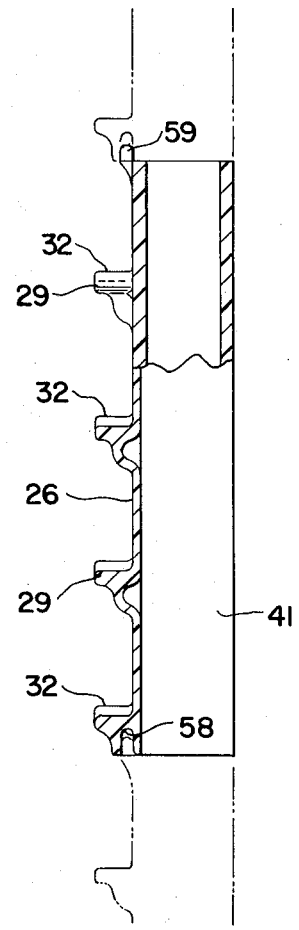
FIG. 20 is a vertical sectional view on line 20—20 of FIG. 19.
Figure 21:
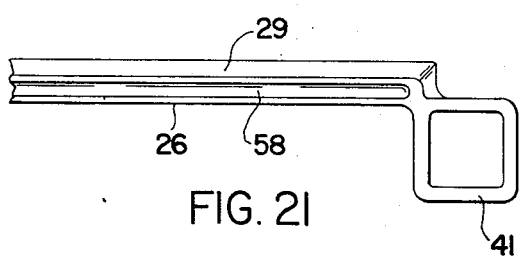
FIG. 21 is a partial bottom plan view on line 21—21 of FIG. 19.

The sleeve has a counterbore 51 of square cross section extending downwardly from its upper end and terminating in an inclined seating shoulder 52 intermediate the ends of the sleeve. Preferably, the shoulder 52 defines a plane inclined 45° to the vertical and extending from the outer corner portion of the sleeve diagonally downward to the inner corner portion, as seen in FIG. 12. The counterbore 51 is dimensioned to slidably receive the lower end portion of a post 40 which has an internally threaded insert plug 53 secured therein by a pin 54 into which the stem 45 of the caster is screwed, and the bottom of the post is cut off diagonally at 45° to the vertical so that its bottom surface 55 mates with the surface of the seating shoulder 52.

It will be seen that as the stem 45 of the caster is screwed into the plug 53 the inclined end of the post will be wedged downwardly on the inclined seating surface, making a rigid connection within the base between the post and the caster. By having the mating surfaces inclined diagonally inward and downward from the outer corner the wedging effect will be in a direction diagonally across the corner of the base so as to balance the effect between the adjoining side and end of the base. Preferably, the upper surface of each corner of the base is provided with a recess groove surrounding the square opening into which the post fits, and an O-ring 56 is seated in the groove to seal the opening against the ingress of moisture.

Referring to FIGS. 18 – 21, each side wall section 26 preferably has a bottom edge groove 58 in the bottom rib 29 thereof and an upper rib 59 in the same vertical plane extending along the upper inner edge of the section. When the first side wall section is positioned on the base by telescoping its tubular end portions 41 over the posts 40, the rib 35c on the base (FIG. 13) is received in its bottom edge groove 58 to lock the side wall in place. When the next side wall section is stacked on top of the first section, the upper rib 59 of the first section is received in the bottom groove 58 of the second section to interlock the two sections. The third side wall section is then stacked on and interlocked with the second section in the same manner, and the top rib 59 thereof is adapted to be received in bottom grooves in the top section 27, as will be described.

The rectangular top section indicated generally at 27 in FIGS. 1 and 2 fits over the four corner posts 40 and the upper side wall sections 26 in the manner shown in detail in FIGS. 3 – 9. The top section is molded of suitable plastic thermoplastic material such as polycarbonate and preferably has a flat top wall 60 with side walls 61 and end walls 62 depending therefrom. The upper surface of the top wall may have marginal ribs 63 and 64 thereon, adjacent to its side and end edges, respectively, for the purpose of retaining a cutting board supported on the top wall, when desired.

From the underside of top wall 60 vertical ribs or flanges 61' and 62' depend and extend laterally parallel to outer side and end walls 61 and 62, respectively. These ribs are adjacent to and spaced inwardly of the respective side and end walls. At longitudinal intervals along the ribs 61' and 62' are vertical ribs 61a and 62a, respectively, projecting inwardly at right angles to the ribs 61' and 62', and these ribs have notches 61b and 62b in their bottom edges, the notches 61b being adapted to receive the top ribs 59 of the upper side wall sections 26. Preferably, reinforcing ribs 66 on the underside of the top wall 60 extend angularly from the ribs 61' and 62' to a central circular rib 65 (FIG. 2), the ribs 66 gradually increasing in depth as they approach the circular rib 65.

Figure 4:
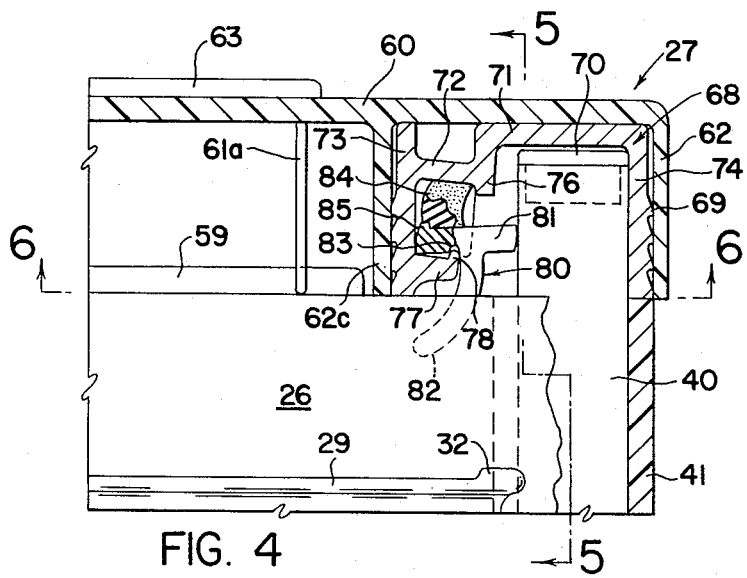
FIG. 4 is a sectional view on line 4—4 of FIG. 3, showing the trigger latch mechanism connecting the top section to the corner posts.
Figure 5:
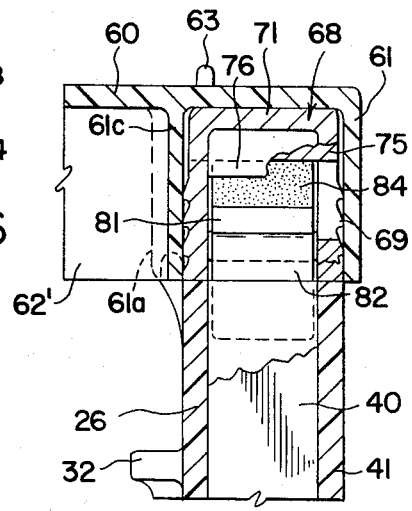
FIG. 5 is a sectional view on line 5—5 of FIG. 4.
Figure 6:
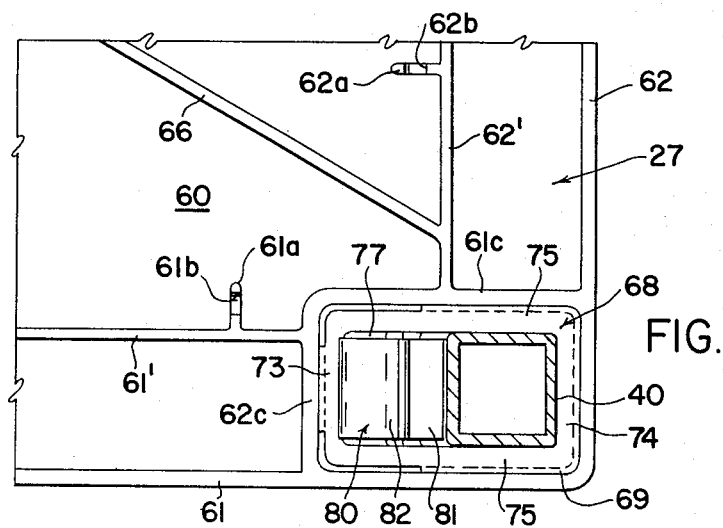
FIG. 6 is a bottom sectional view on line 6—6 of FIG. 5.

At each corner portion of the top the inner ribs 61' and 62' terminate and connect with depending vertical walls 61c and 62c which are parallel with side and end walls 61 and 62, respectively. The walls 61c and 62c intersect each other at their inner ends and intersect the side and end walls 61 and 62 at their outer ends, thus forming a downwardly open rectangular well or enclosure at each corner of the top section. As best shown in FIGS. 4 and 7, the height of each corner post 40 is such that it extends above the upper side wall section and projects into a corner well.

An insert cap indicated generally at 68, preferably of lightweight metal such as aluminum may be provided with peripheral barb-shaped ribs 69 adapted to fit frictionally within the walls of each corner well and to enclose the projecting portion of a post 40. The insert cap may also be secured in the corner well by conventional heating and ultrasonic methods. The post may have a closure plug 70 fitted into its upper end, as indicated in FIGS. 4, 7 and 8. The top wall 71 of insert cap 68 is adapted to abut the underside of top wall 60 of the top section, and has a downwardly offset portion 72 adjoining its inner end wall 73.

The outer end wall 74 and side walls 75 of insert cap 68 are adapted to surround and abut three sides of the projecting portion of the post, and a transverse vertical wall 76 formed between the offset 72 and top wall 71 abuts the fourth side. Below the offset wall 72 is a transverse retaining wall 77 with an upper lip 78 on its inner edge. A metal trigger latch 80 is mounted on the retaining wall 77, and the trigger has an upper crossbar 81 with a curved finger portion 82 depending therefrom. On one side of the portion 82 the bar 81 has a bottom groove 83 adapted to fit over the lip 78 of the insert and the opposite end of the bar is adapted to frictionally engage the adjacent side of the post, when resiliently held in position by a block of elastomeric or rubber-like material 84 compressed between the bar 81 and the offset wall 72, in the position of FIG. 4.

When the top section 27 is forced downwardly over the four corner posts 40 each latch crossbar 81 frictionally engages a post and the rubber block 84 acts as a spring resiliently wedging the crossbar 81 against the post. Any attempt to remove the top section without using the trigger latch creates additional pressure and increases the wedging force against the post. Thus, the top section securely ties together all four corner posts into a stable and rigid structure.

Now referring to FIG. 7, the trigger latch may be released by reaching under the top section and squeezing the finger portion 82 to compress the rubber-like block 84 and tilt the crossbar 81 upwardly, releasing it from contact with the post 40. By squeezing the two latches along one side wall to this position simultaneously, one side of the top section can be removed, and then the other side. A lip 85 on the rear upper edge of the bar 81 engages the rear edge of the block and guards against accidental removal of the latch, but allows removal for cleaning purposes. After the top section is removed and the trigger latches 80 are released, the rubber blocks will hold the latches within the top section in position of FIG. 4.

The novel food service vehicle of the present invention is adapted to be used in a modular storage and transport system based on standard dimension receptacles in common use in the industry. It is easily converted from a mobile cart to a dolly by removing the side wall sections and corner posts, or to a storage rack of increased height by changing the corner posts and adding side wall sections. In all cases the exposed portions of the vehicle are plastic, except for the casters and trigger latches, thus providing non-corrosive and sanitary surfaces. The vechicle is attractive in appearance, inexpensive, and light in weight, making it easy to manipulate.

We claim:

1. A food service storage and transport vehicle having a rectangular molded plastic base, casters supporting the corners of said base, vertical posts having their bottom portions inserted in said corners, insert means rigidly connecting said bottom portions within said base to said casters, stacked side wall sections of molded plastic supported on said base and having tubular end portions telescopically fitting said posts, a rectangular top section of molded plastic fitting over the tops of said posts, and latch means mounted in said top section wedgably engaging said posts.

2. A food service vehicle as defined in claim 1, in which the stacked side wall sections have interior guide ribs with retainer knobs at their ends for slidably supporting the side flanges of standard food receptacles while preventing accidental removal thereof.

3. A food service vehicle as defined in claim 1, in which the insert means comprises a tube secured in each corner of the base wedgably supporting the bottom of the post therein, and a stem on the caster extends through the tube and is rigidly secured to said post.

4. A food service vehicle as defined in claim 3, in which the insert tube has an inclined seating surface therein, and the bottom of the post has a mating inclined surface resting thereon.

5. A food service vehicle as defined in claim 3, in which the bottom portion of the post has a plug secured therein and the caster stem is screwed into said plug.

6. A food service vehicle as defined in claim 3, in which the mating inclined surfaces are inclined diagonally downward and inward from each corner of the base.

7. A food service vehicle as defined in claim 1, in which the top section has insert caps secured in its corners for fitting over the tops of said posts, and the latch means is mounted in said insert caps for releasably abutting said posts.

8. A food service vehicle as defined in claim 7, in which each latch means comprises a trigger member having a bar abutting the post, and resilient means to bias the bar into abutment.

9. A food service vehicle as defined in claim 8, in which walls are provided in each insert cap to mount the bar and to normally retain the trigger member therein when the top section is removed.

10. A food service vehicle as defined in claim 9, in which the resilient means is a block of rubber-like material engaged by the retainer walls in the insert cap to normally retain the trigger member in the top section when it is removed from the posts.

11. In a food service storage and transport vehicle having a rectangular molded plastic base supported at the corners by casters, insert means in said base comprising a tube secured in each corner of the base, vertical posts adapted for mounting removable side wall sections on said base and having their bottom portions wedgably supported in said tubes, stems on said casters extending through said tubes and rigidly secured to said posts, a top section fitting over the tops of said posts, and latch means engaging said posts.

12. A food service vehicle as defined in claim 11, in which the insert tube has an inclined seating surface therein, and the bottom of the post has a mating inclined surface resting thereon.

13. A food service vehicle as defined in claim 11, in which the bottom portion of the post has a plug secured therein and the caster stem is screwed into said plug.

14. A food service vehicle as defined in claim 11, in which said top section has insert caps secured in its corners for fitting over the tops of said posts, and the latch means is mounted in said insert caps for releasably abutting said posts.

15. A food service vehicle as defined in claim 14, in which each latch means comprises a trigger member having a bar abutting the post, and a resilient block of rubber-like material to bias the bar into abutment.

16. A food service vehicle as defined in claim 15, in which walls are provided in each insert cap to mount the bar and to normally retain the trigger member therein when the top section is removed.

17. A food storage and transport vehicle having a rectangular molded plastic base provided with corner openings, insert means in said openings, vertical corner posts having their bottom portions received in and wedgably abutting said insert means, casters supporting the corners of said base and having stems rigidly connected through said insert means to said posts, stacked side wall sections of molded plastic supported on said base and having tubular end portions telescopically fitting said posts, said side wall sections having interior guide ribs for supporting side flanges of food receptacles, said ribs having end retainer knobs preventing accidental removal of said receptacles, a rectangular top section of molded plastic fitting the tops of said posts, and trigger latch means mounted in the corners of said top section to wedgably engage said posts.

* * * * *